US012802300B2

(12) United States Patent
Shukla et al.

(10) Patent No.: US 12,802,300 B2
(45) Date of Patent: Nov. 17, 2026

(54) CONDITIONAL IMAGE SYNTHESIS

(71) Applicant: ADOBE INC., San Jose, CA (US)

(72) Inventors: Tripti Shukla, Lucknow (IN); Srikrishna Karanam, Bangalore (IN); Balaji Vasan Srinivasan, Bangalore (IN)

(73) Assignee: ADOBE INC., San Jose, CA (US)

( * ) Notice: Subject to any disclaimer, the term of this patent is extended or adjusted under 35 U.S.C. 154(b) by 122 days.

(21) Appl. No.: 18/901,529

(22) Filed: Sep. 30, 2024

(65) Prior Publication Data

US 2026/0094316 A1 Apr. 2, 2026

(51) Int. Cl.
*G06T 11/10* (2026.01)
*G06T 7/13* (2017.01)
*G06T 7/181* (2017.01)

(52) U.S. Cl.
CPC ................ *G06T 11/10* (2026.01); *G06T 7/13* (2017.01); *G06T 7/181* (2017.01)

(58) Field of Classification Search
None
See application file for complete search history.

(56) References Cited

U.S. PATENT DOCUMENTS

2025/0166053 A1* 5/2025 Hottelet ............. G06Q 30/0643
2026/0065559 A1* 3/2026 Bai ......................... G06T 11/00

OTHER PUBLICATIONS

1Ho, et al., "Denoising Diffusion Probabilistic Models", arXiv preprint arXiv:2006.11239v2 [cs.LG] Dec. 16, 2020, 25 pages.
2Karras, et al., "Progressive Growing of Gans for Improved Quality, Stability, and Variation", arXiv preprint arXiv:1710.10196v3 [cs.NE] Feb. 26, 2018, 26, pages.
3Avrahami, et al., "Blended Diffusion for Text-driven Editing of Natural Images", 2022, 32 pages.
4Rombach, et al., "High-Resolution Image Synthesis with Latent Diffusion Models", arXiv preprint arXiv:2112.10752v2 [cs.CV] Apr. 13, 2022, 45 pages.
5Mou, et al., "T2I-Adapter: Learning Adapters to Dig out More Controllable Ability for Text-to-Image Diffusion Models", arXiv preprint arXiv:2302.08453v2 [cs.CV] Mar. 20, 2023, 10 pages.
6Liu, et al., "More Control for Free! Image Synthesis with Semantic Diffusion Guidance", arXiv preprint arXiv:2112.05744v4 [cs.CV] Dec. 5, 2022, 11 pages.

(Continued)

*Primary Examiner* — Frank S Chen
(74) *Attorney, Agent, or Firm* — F. CHAU & ASSOCIATES, LLC

(57) ABSTRACT

A method, apparatus, non-transitory computer readable medium, and system for conditional text-to-image synthesis include obtaining a prompt input and a color input. The prompt input describes an image element, and the color input indicates a color palette. Embodiments then perform an optimization of an intermediate noise map by computing a color loss based on the color input to obtain a conditioned noise map. Subsequently, embodiments generate, using an image generation model, a synthetic image based on the prompt input and the conditioned noise map, wherein the synthetic image depicts the image element and includes colors from the color palette. Some embodiments are further configured to optimize an intermediate noise map based on a shape input, where the shape input indicates a shape for the image element.

20 Claims, 11 Drawing Sheets

(56) References Cited

OTHER PUBLICATIONS

7Zhao, et al., "Uni-ControlNet: All-in-One Control to Text-to-Image Diffusion Models", arXiv preprint arXiv:2305.16322v3 [cs.CV] Oct. 29, 2023, 23 pages.
8Yu, et al., "FreeDoM: Training-Free Energy-Guided Conditional Diffusion Model", arXiv preprint arXiv:2303.09833v1 [cs.CV] Mar. 17, 2023, 18 pages.
9Sohl-Dickstein, et al., "Deep Unsupervised Learning using Nonequilibrium Thermodynamics", arXiv preprint arXiv:1503.03585v8 [cs.LG] Nov. 18, 2015I, 18 pages.
10Song, et al., "Generative Modeling by Estimating Gradients of the Data Distribution", arXiv preprint arXiv:1907.05600v3 [cs.LG] Oct. 10, 2020, 23 pages.

* cited by examiner

CONDITIONAL IMAGE SYNTHESIS

BACKGROUND

The following relates generally to image processing, and more specifically to conditional image generation. Image processing is a type of data processing that involves the manipulation of an image to get the desired output, typically utilizing specialized algorithms and techniques. It is a method used to perform operations on an image to enhance its quality or to extract useful information from it. This process usually comprises a series of steps that includes the importation of the image, its analysis, manipulation to enhance features or remove noise, and the eventual output of the enhanced image or salient information it contains.

Image processing techniques are also used for image generation. For example, machine learning (ML) techniques have been applied to create generative models that can produce new image content. One use for generative AI is to create images based on an input prompt. This task is often referred to as a "text to image" task or simply "text2img". Some models such as GANs and Variational Autoencoders (VAEs) employ an encoder-decoder architecture with attention mechanisms to align various parts of text with image features. Newer approaches such as denoising diffusion probabilistic models (DDPMs) iteratively refine generated images based on textual prompts. In some cases, the image generation may be conditioned on some additional input, such as an edge map image that indicates a desired shape of the image.

SUMMARY

Embodiments of the inventive concepts described herein include systems and methods for conditional text-to-image synthesis. "Conditional" generation refers to the system's ability to generate images that align with an input condition, such as a color palette or an edge map. Embodiments include an image generation model that performs a generative denoising process, guided by the input condition. The denoising process involves computing a denoising vector based on a combined score function. This combined score function is the gradient of the log-likelihood of the data with respect to the data itself, augmented with a conditional term that considers the input condition. This additional term quantifies the distance between the currently generated sample and the input condition. In this way, embodiments generate an image that aligns with a text prompt and an input condition by denoising based on the combined score function, enabling conditional image generation without requiring custom trained models for each type of condition.

A method, apparatus, non-transitory computer readable medium, and system for image generation are described. One or more aspects of the method, apparatus, non-transitory computer readable medium, and system include obtaining a prompt input and a color input, wherein the prompt input describes an image element and the color input indicates a color palette; generating a conditioned noise map by performing a noise map optimization using a color loss based on the color input; and generating, using an image generation model, a synthetic image based on the prompt input and the conditioned noise map, wherein the synthetic image depicts the image element and includes colors from the color palette.

A method, apparatus, non-transitory computer readable medium, and system for image generation are described. One or more aspects of the method, apparatus, non-transitory computer readable medium, and system include obtaining a prompt input and a shape input, wherein the prompt input describes an image element and the shape input indicates a shape for the image element; generating a conditioned noise map performing a noise map optimization using a shape loss based on the shape input; and generating, using an image generation model, a synthetic image based on the prompt input and the conditioned noise map, wherein the synthetic image depicts the image element with the shape indicated by the shape input.

An apparatus, system, and method for image generation are described. One or more aspects of the apparatus, system, and method include at least one processor; at least one memory storing instructions executable by the at least one processor; a condition encoder comprising parameters stored in the memory component and configured to encode a condition input representing a color palette to obtain a condition embedding; and an image generation model configured to generate a conditioned noise map by performing a noise map optimization using the condition embedding and to generate a synthetic image based on a prompt input and the conditioned noise map.

DETAILED DESCRIPTION

Figure 1:
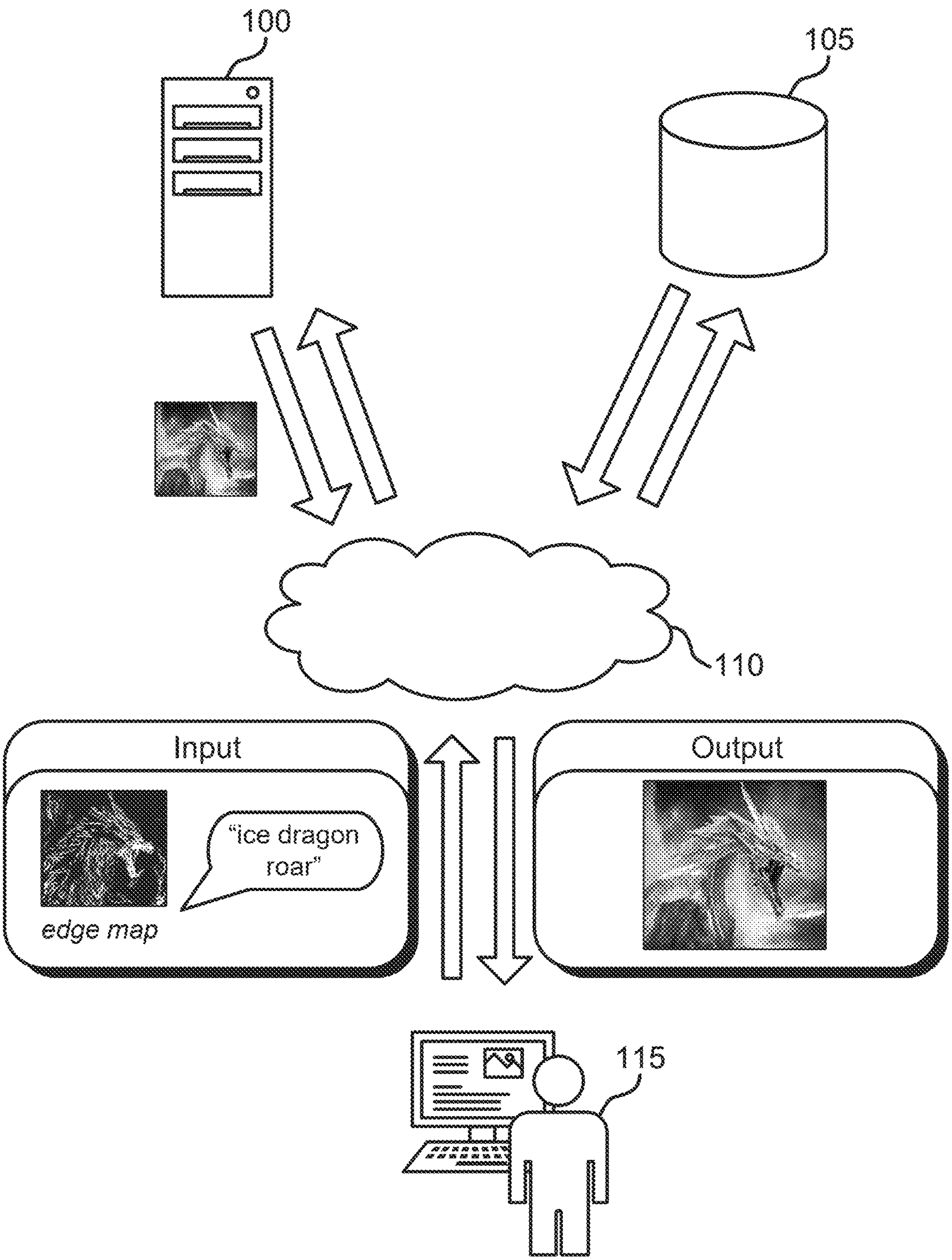
FIG. 1 shows an example of an image processing system according to aspects of the present disclosure.

Image generation is frequently used in creative workflows. Historically, users would rely on manual techniques and drawing software to create visual content. The advent of machine learning (ML) has enabled new workflows that automate the image creation process.

ML is a field of data processing that focuses on building algorithms capable of learning from and making predictions or decisions based on data. It includes a variety of techniques, ranging from simple linear regression to complex neural networks, and plays a significant role in automating and optimizing tasks that would otherwise require extensive human intervention.

Generative models in ML are algorithms designed to generate new data samples that resemble a given dataset. Generative models are used in various fields, including image generation. They work by learning patterns, features, and distributions from a dataset and then using this understanding to produce new, original outputs.

Some conventional approaches for text-to-image generation include Generative Adversarial Networks (GANs), which have demonstrated impressive performance in generating realistic images from text prompts. However, GANs face challenges such as training instability and poor generalizability. Recent advancements in diffusion models have shown promise in generating high-quality images from text prompts. The text-to-image diffusion models incorporate a pre-trained text encoder that is configured to generate a text embedding from an input text, and features of the text embedding are combined with the intermediate image features during image synthesis using cross-attention.

In the context of conditional image generation, several approaches introduce additional conditions like pose, color, or segmentation maps to guide the image generation process. Methods such as T2I-Adapter, ControlNet, and Uni-ControlNet apply these additional conditions alongside text prompts to achieve conditional generation. However, these approaches entail training or fine-tuning separate add-on models (sometimes referred to as "adapter models") for each type of condition, which limits their generalizability and increases the training cost. This dependency on extra training steps and modules restricts the flexibility and broad applicability of these methods across diverse conditions. There exist some training-free approaches for conditional generation. However, these approaches, absent additional trained adapter networks, are generally limited to particular conditioning consisting of poses and segmentation maps and tend to produce inconsistent results when generating images outside of the domain of human faces.

Embodiments of the present inventive concepts reduce model training and implementation time for conditional image synthesis. Rather than implement additional models such as adapter layers or control networks, embodiments condition an intermediate noise map (e.g., the latent image sample at inference-time) for a particular set of diffusion timesteps—an optimization phase-using a test-time loss that aligns the intermediate noise map with the input condition.

For example, some embodiments include a condition encoder configured to map an input condition and an intermediate noise map to a common space. The condition encoder may include a color encoder that projects an input color palette onto an image, referred to as a spatial color palette. This spatial color palette is then compared to the intermediate noise map to quantify their alignment. Additionally or alternatively, the condition encoder may include an edge map generator configured to generate an edge map from the intermediate noise map. This generated edge map can be compared to an input condition edge map.

A gradient component quantifies the differences between the reference condition and the intermediate noise map as a gradient term (sometimes referred to herein as a "conditional term"). This gradient term is incorporated into a conditional score function that influences the denoising process, aligning the generated image with the reference condition. In this way, embodiments provide test-time systems and methods for conditional image generation without additional training.

An image processing system configured to perform conditional image generation is described with reference to FIGS. 1-4. Methods for generating synthetic images based on an input prompt and an input condition are described with reference to FIGS. 5-9. Examples of different sets of diffusion timesteps for conditioning the image generation on different types of conditions are described with reference to FIGS. 10A-10B. A computing device configured to implement an image processing apparatus is described with reference to FIG. 11.

Image Processing System

FIG. 1 shows an example of an image processing system according to aspects of the present disclosure. The example shown includes image processing apparatus 100, database 105, network 110, and user 115. Image processing apparatus 100 is an example of, or includes aspects of, the corresponding element described with reference to FIG. 2.

In an example process, user 115 provides inputs including a text prompt and an input condition. In the example shown, the input condition is an edge map, and specifies a desired shape of the output. As used herein "map" refers to any multi-dimensional input data, and can include color images, black and white images, or higher-dimension feature tensors. The image processing apparatus 100 processes the inputs to generate an image that is aligned with the input condition and provides the synthetic image to the user. For example, the generated image of an "ice dragon roar" depicts a dragon with a similar shape to the shape shown in the edge map provided by the user.

Embodiments of image processing apparatus 100 include one or more components that are implemented on a server. A server provides one or more functions to users, such as user 115, who are linked by way of one or more of various networks such as network 110. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network 110 management protocol (SNMP) may also be used. In some cases, a server is configured to send and receive hypertext markup language (HTML) formatted files (e.g., for displaying web pages). In various embodiments, a server comprises a general-purpose computing device, a personal computer, a laptop computer, a mainframe computer, a super computer, or any other suitable processing apparatus. According to some aspects, some components of image processing apparatus 100 may be implemented on a server while others are implemented on an edge device such as a user smart device or PC.

Database 105 stores information used by the image processing system. For example, database 105 may store model parameters, training data, stock photos, synthesized photos, executable code, and the like. A database is an organized collection of data. A database stores data in a specified format known as a schema. A database may be structured as a single database, a distributed database, multiple distributed databases, or an emergency backup database. In some cases, a database controller may manage data storage and processing in database 105. In some cases, user 115 interacts with the database controller. In other cases, the database controller may operate automatically without user interaction.

Network 110 facilitates the transfer of information between image processing apparatus 100, database 105, and user 115. Network 110 is sometimes referred to as a "cloud." A cloud is a computer network configured to provide on-demand availability of computer system resources, such as data storage and computing power. In some examples, the cloud provides resources without active management by a user. The term cloud is sometimes used to describe data centers available to many users over the Internet. Some large cloud networks have functions distributed over multiple locations from central servers. A server is designated an edge server if it has a direct or close connection to a user. In some cases, a cloud is limited to a single organization. In other examples, the cloud is available to many organizations. In one example, a cloud includes a multi-layer communications network comprising multiple edge routers and core routers. In another example, a cloud is based on a local collection of switches in a single physical location.

Figure 2:
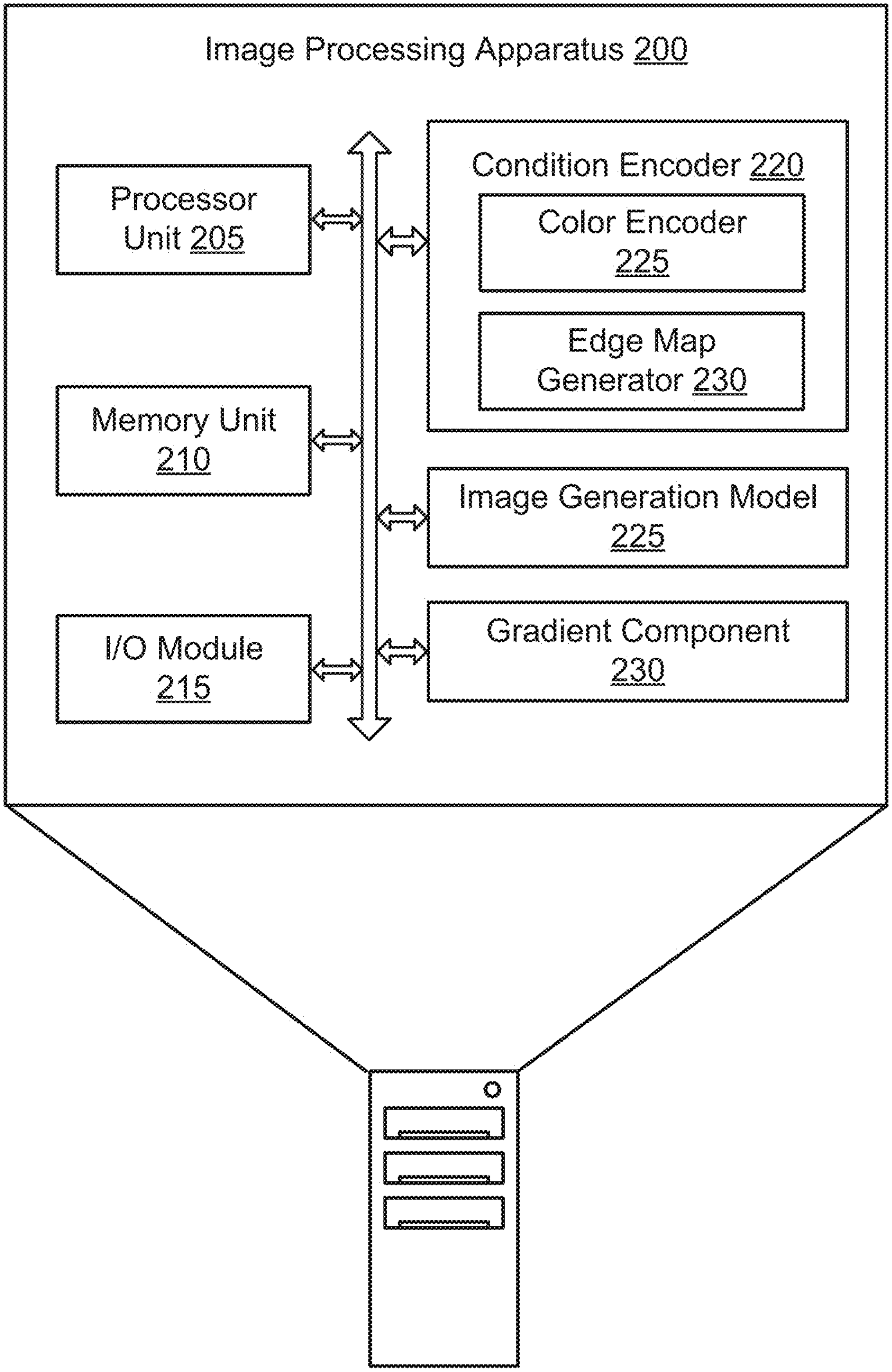
FIG. 2 shows an example of an image processing apparatus according to aspects of the present disclosure.

FIG. 2 shows an example of an image processing apparatus 200 according to aspects of the present disclosure. The example shown includes image processing apparatus 200, processor unit 205, memory unit 210, I/O module 215, condition encoder 220, image generation model 235, and gradient component 240.

Processor unit 205 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor is configured to operate a memory array using a memory controller. In other cases, a memory controller is integrated into the processor. In some cases, the processor is configured to execute computer-readable instructions stored in a memory to perform various functions. In some embodiments, a processor includes special purpose components for modem processing, baseband processing, digital signal processing, or transmission processing.

Memory unit 210 stores information used by image processing apparatus 200, such as model parameters, data, media, and executable code. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

I/O module 215 facilitates user input and handles system outputs. Embodiments of I/O module 215 include a user interface. A user interface may enable a user to interact with a device. In some embodiments, the user interface may include an audio device, such as an external speaker system, an external display device such as a display screen, or an input device (e.g., remote control device interfaced with the user interface directly or through an IO controller module). In some cases, a user interface may be a graphical user interface (GUI).

Condition encoder 220 is configured to transform an input condition or an intermediate noise map into a common form, so that the intermediate noise map can be directly compared with the input condition. Embodiments of condition encoder 220 include a color encoder 225 and an edge map generator 230. The color encoder 225 may transform an input color condition, which may be a list of colors as hex values, into a spatial color palette (also referred to as a "color palette matrix") that can be directly compared with the intermediate noise map. The edge map generator 230 may extract an edge map from the intermediate noise map which can be directly compared to an input edge map condition. Additional detail regarding these transformations is provided with reference to FIG. 5.

According to some aspects, condition encoder 220 encodes the intermediate noise map to obtain a color embedding. In some examples, condition encoder 220 encodes the color input to obtain a condition embedding. In some examples, condition encoder 220 generates a color palette matrix based on the color input. In some examples, condition encoder 220 determines a predicted color distribution based on the intermediate noise map and a target color distribution based on the color input, where the color loss is based on the predicted color distribution and the target color distribution.

According to some aspects, condition encoder 220 identifies a target set of edge pixels based on the shape input. In some examples, condition encoder 220 identifies a predicted set of edge pixels based on the intermediate noise map, where the shape loss is based on the target set of edge pixels and the predicted set of edge pixels.

Image generation model 225 generates synthetic images based on a text prompt and an input condition. Embodiments of image generation model 225 are implemented using one or more artificial neural networks (ANNs). An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. In some examples, nodes may determine their output using other mathematical algorithms (e.g., selecting the max from the inputs as the output) or any other suitable algorithm for activating the node. Each node and edge is associated with one or more node weights that determine how the signal is processed and transmitted.

During the training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

According to some aspects, image generation model 235 generates a synthetic image based on the prompt input and the conditioned noise map, where the synthetic image depicts the image element and includes colors from the color palette. In some examples, image generation model 235 identifies a current timestep. For example, the current timestep may be a diffusion timestep according to a predetermined sampling schedule. In some examples, embodiments execute one or more layers of the image generation model 235 for a set of repetitions at the current timestep. In some examples, image generation model 235 identifies a preliminary timestep prior to the current timestep, where the one or more layers of the image generation model 235 are executed for the set of repetitions between the preliminary timestep and the current timestep. In some examples, image generation model 235 identifies a conditioning zone including a set of timesteps based on the color input, where the where the one or more layers of the image generation model 235 are executed based on the current timestep being within the conditioning zone.

According to some aspects, image generation model 235 generates a synthetic image based on the prompt input and the conditioned noise map, where the synthetic image depicts the image element with a shape indicated by a shape input, such as an edge map. In some examples, image generation model 235 identifies a conditioning zone including a set of timesteps based on the shape input, where the where the one or more layers of the image generation model 235 are executed based on the current timestep being within the conditioning zone. In some examples, embodiments execute one or more layers of the image generation model 235 for a set of repetitions at the current timestep. Image generation model 235 is an example of, or includes aspects of, the corresponding element described with reference to FIG. 5.

Gradient component 240 is configured to compute a conditional term based on differences between the intermediate noise map generated by the image generation model and an input condition, such as an edge map or a color palette. For example, gradient component 240 may compute a color loss or a shape loss. The color loss, the shape loss, or a combination of thereof may be used in computing a conditional score function, which "optimizes" the intermediate noise map. In some cases, the optimization refers to a denoising operation that aligns the intermediate noise map with the input condition.

According to some aspects, gradient component 240 performs an optimization of an intermediate noise map by computing a color loss based on the color input to obtain a conditioned noise map. In some examples, gradient component 240 computes a distance between the color embedding and the condition embedding, where the color loss is based on the distance. In some examples, gradient component 240 computes a pairwise distance for each of a set of pixels based on the intermediate noise map and the color palette matrix, where the color loss is computed based on the pairwise distance. In some examples, gradient component 240 performs a softmax transformation on the pairwise distance for each of the set of pixels, where the color loss is based on the softmax transformation. In some aspects, the color loss is based on an energy conditioning function.

According to some aspects, gradient component 240 performs an optimization of an intermediate noise map by computing a shape loss based on the shape input to obtain a conditioned noise map. In some examples, gradient component 240 computes an intersection over union (IoU) ratio based on the target set of edge pixels and the predicted set of edge pixels, where the shape loss is based on the IoU ratio. Gradient component 240 is an example of, or includes aspects of, the corresponding element described with reference to FIG. 5.

Figure 3:
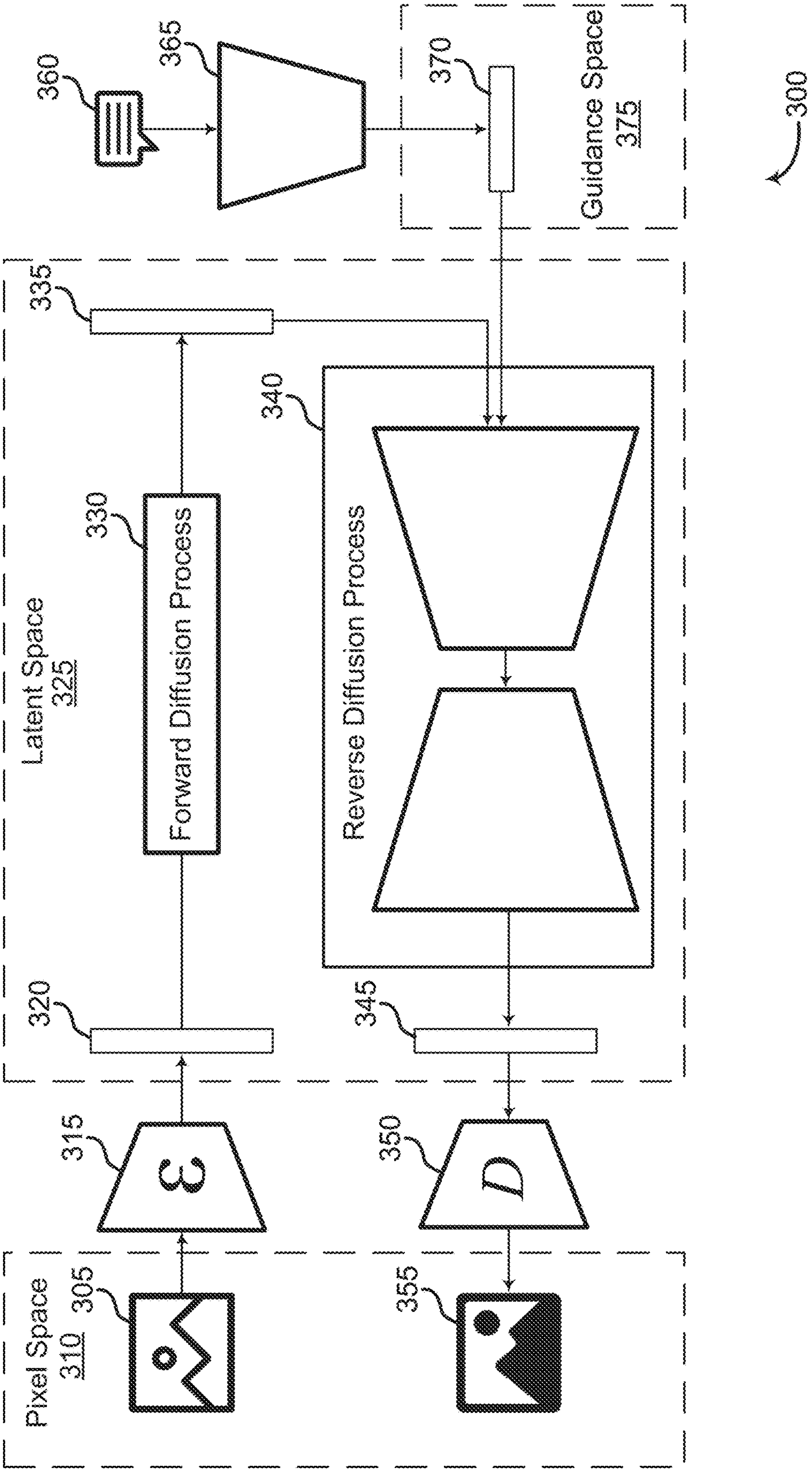
FIG. 3 shows an example of a guided latent diffusion model according to aspects of the present disclosure.

FIG. 3 shows an example of a guided latent diffusion model 300 according to aspects of the present disclosure. The example shown includes guided latent diffusion model 300, original image 305, pixel space 310, image encoder 315, original image features 320, latent space 325, forward diffusion process 330, noisy features 335, reverse diffusion process 340, denoised image features 345, image decoder 350, output image 355, text prompt 360, text encoder 365, guidance features 370, and guidance space 375. According to some aspects, guided latent diffusion model 300 is an example of or is a component of the image generation model described with reference to FIG. 2.

Diffusion models are a class of generative neural networks which can be trained to generate new data with features similar to features found in training data. In particular, diffusion models can be used to generate novel images. Diffusion models can be used for various image generation tasks including image super-resolution, generation of images with perceptual metrics, conditional generation (e.g., generation based on text guidance), image inpainting, and image manipulation.

Types of diffusion models include Denoising Diffusion Probabilistic Models (DDPMs) and Denoising Diffusion Implicit Models (DDIMs). In DDPMs, the generative process includes reversing a stochastic Markov diffusion process. DDIMs, on the other hand, use a deterministic process so that the same input results in the same output. Diffusion models may also be characterized by whether the noise is added to the image itself, or to image features generated by an encoder (i.e., latent diffusion).

Diffusion models work by iteratively adding noise to the data during a forward process and then learning to recover the data by denoising the data during a reverse process. For example, during training, guided latent diffusion model 300 may take an original image 305 in a pixel space 310 as input and apply and image encoder 315 to convert original image 305 into original image features 320 in a latent space 325. Then, a forward diffusion process 330 gradually adds noise to the original image features 320 to obtain noisy features 335 (also in latent space 325) at various noise levels.

Next, a reverse diffusion process 340 (e.g., a U-Net ANN) gradually removes the noise from the noisy features 335 at the various noise levels to obtain denoised image features 345 in latent space 325. In some examples, the denoised image features 345 are compared to the original image features 320 at each of the various noise levels, and parameters of the reverse diffusion process 340 of the diffusion model are updated based on the comparison. Finally, an image decoder 350 decodes the denoised image features 345 to obtain an output image 355 in pixel space 310. In some cases, an output image 355 is created at each of the various noise levels. The output image 355 can be compared to the original image 305 to train the reverse diffusion process 340.

In some cases, image encoder 315 and image decoder 350 are pre-trained prior to training the reverse diffusion process 340. In some examples, they are trained jointly, or the image encoder 315 and image decoder 350 and fine-tuned jointly with the reverse diffusion process 340.

The reverse diffusion process 340 can also be guided based on a text prompt 360. The text prompt 360 can be encoded using a text encoder 365 (e.g., a multimodal encoder) to obtain guidance features 370 in guidance space 375. The guidance features 370 can be combined with the noisy features 335 at one or more layers of the reverse diffusion process 340 to ensure that the output image 355 includes content described by the text prompt 360. For example, guidance features 370 can be combined with the noisy features 335 using a cross-attention block within the reverse diffusion process 340.

Figure 4:
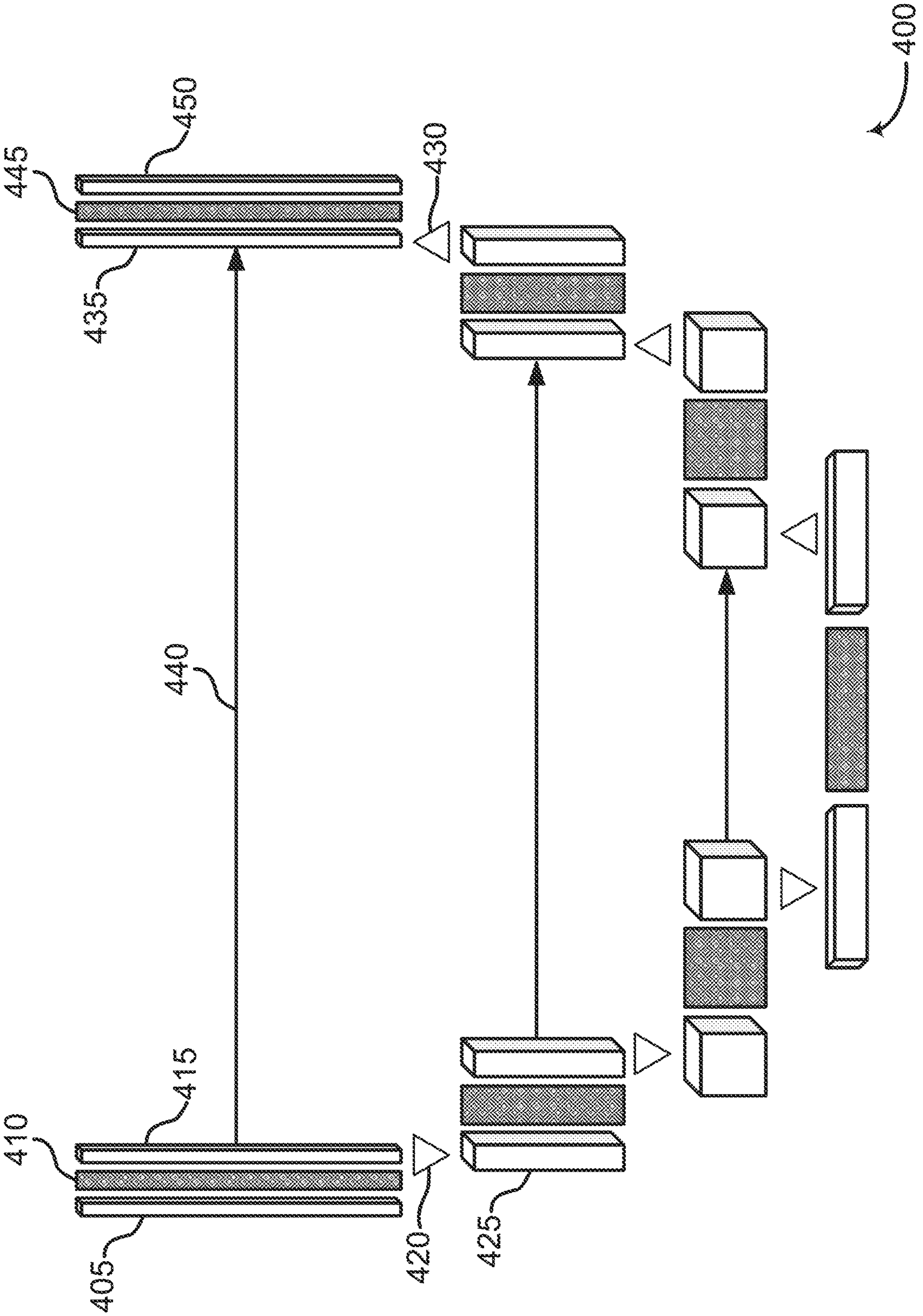
FIG. 4 shows an example of a U-Net according to aspects of the present disclosure.

FIG. 4 shows an example of a U-Net 400 according to aspects of the present disclosure. In some examples, U-Net 400 is an example of the component that performs the reverse diffusion process 325 of guided diffusion model 300 described with reference to FIG. 3 and includes architectural elements of the image generation model 225 described with reference to FIG. 2. The U-Net 400 depicted in FIG. 4 is an example of, or includes aspects of, the architecture used within the reverse diffusion process described with reference to FIG. 3.

In some examples, diffusion models are based on a neural network architecture known as a U-Net. The U-Net 400 takes input features 405 having an initial resolution and an initial number of channels and processes the input features 405 using an initial neural network layer 410 (e.g., a convolutional network layer) to produce intermediate features 415. The intermediate features 415 are then down-sampled using a down-sampling layer 420 such that down-sampled features 425 have a resolution less than the initial resolution and a number of channels greater than the initial number of channels.

This process is repeated multiple times, and then the process is reversed. That is, the down-sampled features 425 are up-sampled using up-sampling process 430 to obtain up-sampled features 435. The up-sampled features 435 can be combined with intermediate features 415 having the same resolution and number of channels via a skip connection 440. These inputs are processed using a final neural network layer 445 to produce output features 450. In some cases, the output features 450 have the same resolution as the initial resolution and the same number of channels as the initial number of channels.

In some cases, U-Net 400 takes additional input features to produce conditionally generated output. For example, the additional input features could include a vector representation of an input prompt. The additional input features can be combined with the intermediate features 415 within the neural network at one or more layers. For example, a cross-attention module can be used to combine the additional input features and the intermediate features 415.

Conditional Image Generation

Embodiments of the present inventive concepts described herein are configured to generate synthetic images that align with an input condition. The input condition includes data such as an edge map or a color palette. According to some aspects, rather than computing features using a separate network trained to encode the condition, embodiments consider the input condition by computing a conditional score function, from which the denoising vector used to denoise the intermediate noise map is derived.

Figure 5:
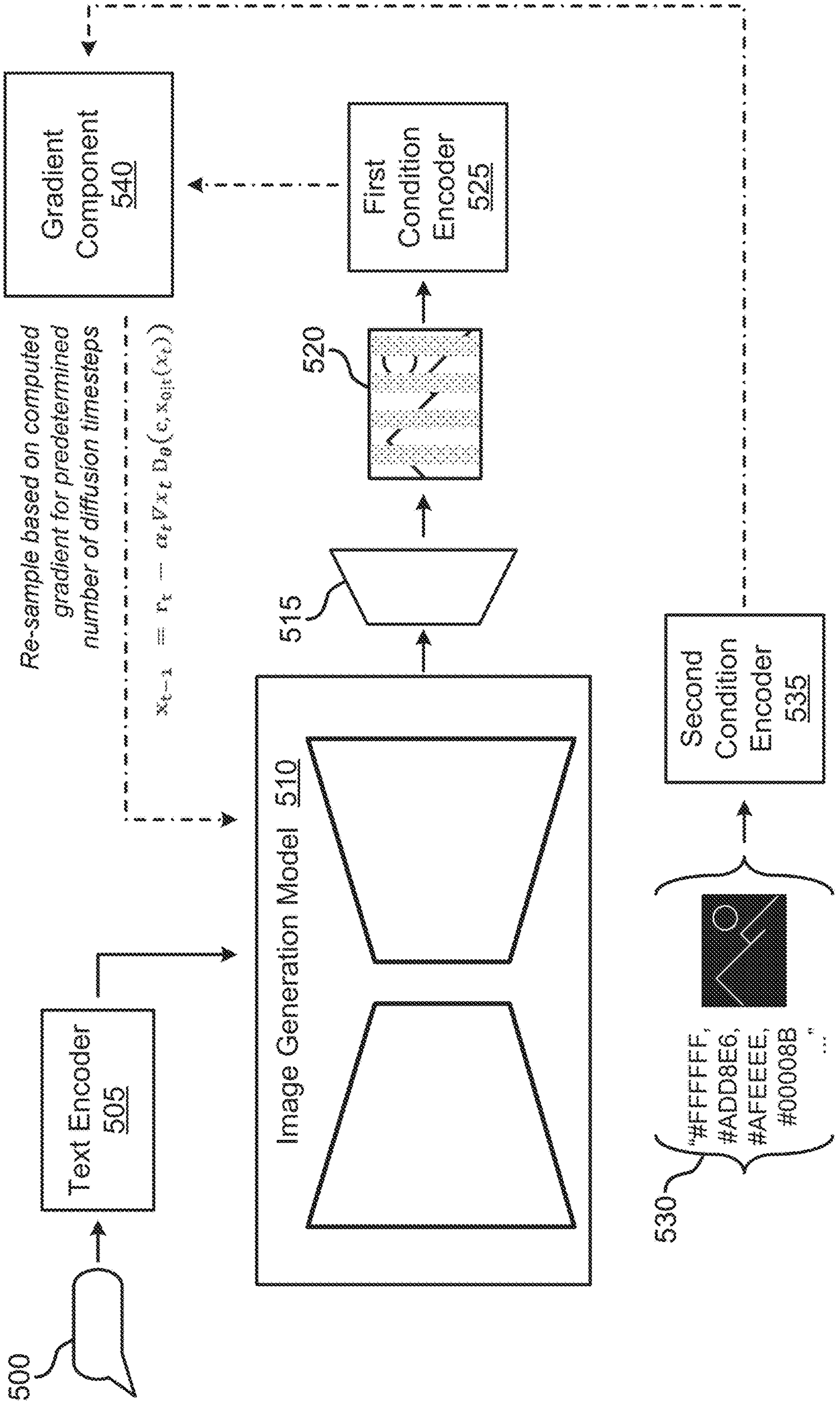
FIG. 5 shows an example of a conditional image generation pipeline according to aspects of the present disclosure.

FIG. 5 shows an example of a conditional image generation pipeline according to aspects of the present disclosure. The example shown includes text prompt 500, text encoder 505, image generation model 510, image decoder 515, intermediate noise map 520, first condition encoder 525, condition 530, second condition encoder 535, and gradient component 540.

Text encoder 505 is an example of, or includes aspects of, the corresponding element described with reference to FIG. 3. Image generation model 510 is an example of, or includes aspects of, the corresponding element described with reference to FIG. 2. Image decoder 515 is an example of, or includes aspects of, the corresponding element described with reference to FIG. 3. Gradient component 540 is an example of, or includes aspects of, the corresponding element described with reference to FIG. 2.

Text encoder 505 encodes text prompt 500 to generate text features which are input to image generation model 510 via, e.g., cross-attention. The text prompt 500 may be provided by a user via a user interface. The user may further provide condition 530. In this example, condition 530 includes a color palette and an edge map. The color palette may be a list of colors that the user wishes to have in the generated synthetic image, and the edge map may be an image including lines along the contours of a desired shape.

In some embodiments, the first condition encoder 525 and second condition encoder 535 are configured to perform the same task, which is to map intermediate noise map 520 and condition 530 to a common space so that features therefrom may be directly compared. The first condition encoder 525 and second condition encoder 535 may be duplicates, or a single condition encoder may be reused ("condition encoder" hereafter). According to some aspects, the first condition encoder 525 and second condition encoder 535 include pretrained models or rule-based models or both. For example, the condition encoder may first compute, using a pre-trained color encoder, a spatial color palette sp from the color palette. In some embodiments, the condition encoder generates sp using both the color palette and text prompt 500. The spatial color palette sp is a rough mapping of where particular colors should be placed in the final generated image. Some embodiments generate sp using a uniform distribution. For example, some embodiments randomly sample color values from a continuous uniform distribution that is defined over a color space based on the input color palette. The lower and upper bounds of the color distribution may be decided by the color palette or may be decided based on an external parameter such as a "color diversity" parameter.

Gradient component 540 then computes a color loss based on extracted features in the LAB color space from sp generated from condition 530, denoted as $LAB_{gen}$, and extracted features of intermediate noise map 520, denoted as $LAB_{ref}$. The color features may be computed directly from intermediate noise map 520 or may be computed from an RGB version after being decoded by image decoder 515. In some examples, this loss is computed as an L2 Euclidean loss:

$$L_{Euclidean} = \|LAB_{gen} - LAB_{ref}\|_2 \tag{1}$$

In some embodiments, the color loss is alternatively or additionally a pixel-based loss. For example, for a given sampling stage (e.g., a diffusion timestep), let $m \in \mathbb{R}^P$ represent a probability distribution over P colors in the color palette. The colors in the palette are organized in a P×3 matrix $Q \in \mathbb{R}^{(P\times 3)}$. During the sampling process, image decoder 515 decodes intermediate noise map 520 to obtain the RGB image, and then gradient component 540 computes a pairwise distance matrix D between the pixels of the RGB image and the color palette matrix Q, where the distance between pixels is the Euclidean distance, and further computing the softmax along the color palette dimension:

$$D_{sm} = \text{softmax}(-\rho D) \tag{2}$$

where ρ is a sharpness parameter, which may be set to, for example, 100. A higher value for the sharpness parameter may encourage a stronger affinity for the nearest palette color for each pixel during generation. In some embodiments, gradient component 540 further sums $D_{sm}$ along the pixel dimension (for example, 512×512×3), normalizes the result to obtain d', and obtains the distribution similarity $L_{DS}$ as the color loss, where the distribution similarity is the cross-entropy between the predicted color distribution from intermediate noise map 520 and the ground truth color distribution from condition 530:

$$L_{DS} = CE(d_p, d_{x_t}) \quad (3)$$

where $d_{x_t}$ and $d_p$ are the color distributions for the intermediate noise map 520 and the color condition from 530, respectively. In some embodiments, the final color loss is a weighted combination of the color distribution similarity and the color features distance:

$$L_{color} = \lambda_1 \cdot L_{DistSim} + \lambda_2 \cdot L_{Euclidean} \quad (4)$$

Gradient component 540 may further compute an edge map loss. Embodiments of the condition encoder are further configured to, using an edge map generator, compute an edge map from intermediate noise map 520 that can be compared to an edge map from condition 530. The edge map may be a grayscale image and may have a dimensionality of 1×512×512 though embodiments are not necessarily limited thereto. The edge map generator may use computer vision techniques to extract edges. For example, the edge map generator may use rule-based or ANN techniques to identify high contrast regions corresponding to edges. In some embodiments, a thresholding operation is performed on the extracted edge map to accentuate the edges.

The gradient component 540 then computes an Intersection over Union (IoU) loss between the extracted edge map and the reference edge map. The IoU is a metric is used to quantify the overlap between predicted and ground-truth masks and is a measure of edge alignment. In an example, the IoU is calculated as follows: let $e_{x_t}$ denote the extracted edge map and $e_{rf}$ denote the input condition edge map. The IoU loss, that is, the loss comparing the edge maps (also referred to as a "shape loss") is calculated as:

$$L_{IoU} = \frac{A(e_{x_t} \cap e_{rf})}{A(e_{x_t} \cup e_{rf})} \quad (5)$$

where A(·) represents the number of pixels in the corresponding set.

The gradient component uses the color loss, the edge map loss, or both to compute a conditional score function that is used to denoise the intermediate noise map 520 for a predetermined number of timesteps. Embodiments incorporate the condition losses into the computation of this score function. The primary task in the denoising generative process is determining the score function at each generative iteration. Specifically, this score function is the gradient of the log-likelihood of the data with respect to itself. In simpler terms, the score function guides the image generation model 510 by indicating how far the current sample is from the desired data distribution (synthetic images) and in which direction to denoise to move closer to the desired distribution. In traditional diffusion models, the score function is "unconditional," that is, it depends only on the current sample and does not accommodate additional conditions. The unconditional score function is denoted $\nabla x_t \log p(x_t)$. By contrast, the image generation model 510 computes a conditional score function that considers the condition c, denoted $\nabla x_t \log p(x_t|c)$. The conditional score function can be written as a combination of the unconditional and the conditional terms using Bayes' theorem:

$$\nabla_{x_t} \log p(x_t|c) = \nabla_{x_t} \log p(x_t) + \nabla_{x_t} \log p(c|x_t) \quad (6)$$

where $\nabla x_t \log p(x_t)$ is the unconditional score term, estimated from image generation model 510 and based only on the intermediate sample $x_t$, and $\nabla x_t \log p(c|x_t)$ is a correction gradient (sometimes referred to as a "gradient term") that steers $x_t$ towards a hyperplane in the data space where all data confirms to the condition c.

The gradient term, rather than being computed directly, can be modeled as an energy function expressed like so:

$$p(c|x_t) = \frac{\exp\{-\lambda\varepsilon(c, x_t)\}}{\int_{c \in C} \exp\{-\lambda\varepsilon(c, x_t)\}} \quad (7)$$

where c is the domain of the input condition(s) and λ is the positive temperature coefficient. The energy function, $\varepsilon(c, x_t)$, gauges the alignment between the condition c and the intermediate sample $x_t$, and produces smaller values when $x_t$ aligns more with c. Substituting, we have an expression for the gradient term as:

$$\nabla x_t \log p(c|x_t) \propto -\nabla x_t \varepsilon(c, x_t) \quad (8)$$

which is sometimes referred to as energy conditioning. Using the standard denoising diffusion probability model (DDPM) equation, we have conditional sampling formula for the reverse diffusion process as:

$$x_{t-1} = r_t - \alpha_t \nabla x_t \varepsilon(c, x_t) \quad (9)$$

where $r_t$ is the standard DDPM sampling formula and $\alpha_t$ is the learning rate of the energy conditioning.

The energy conditioning function may itself be approximated by time-independent distance measuring functions using any one of available pretrained distance measuring functions for clean data $x_0$:

$$D_\phi(c, x_t, t) \approx E_{p(x_0|x_t)}[D_\theta(c, x_0)] \quad (10)$$

where $D_\phi(c, x_t, t)$ is the time-dependent distance measuring function, an approximation for the energy condition with ϕ as the pre-trained parameter(s). $D_\theta(c, x_t)$ denotes the time independent distance measuring networks for clean data with θ as the pre-trained parameter(s). According to some aspects, the approximation above is based on the observation that the distance between the noisy image $x_t$ and the condition c is directly proportional to the distance between the clean image $x_0$ corresponding to $x_t$ and the condition c, especially in the last stages of the sampling process.

Accordingly, and recalling Equation (7), the time dependent energy conditioning can be approximated like so:

$$\varepsilon(c, x_t) \approx D_\theta\left(c, x_{0|t}\right) \tag{11}$$

And, combining with the DDPM conditional sampling equation from Equation (9), we have the final conditional sampling formula, where the distance function approximates the energy conditioning function, and the energy conditioning function, in turn, models the correction gradient term, thereby enabling test-time (inference time) conditional generation based on condition 530:

$$x_{t-1} = r_t - \alpha_r \nabla x_t D_\theta\left(c, x_{0|t}(x_t)\right) \tag{12}$$

Accordingly, image generation model 510 denoises according to Equation (12) using the gradient term computed by gradient component 540, where the gradient term is computed based on one or more condition losses. According to some aspects, the denoising based on the input condition is performed for a predetermined range of diffusion timesteps (referred to herein as a "conditioning zone") and repeated a number of times for each timestep in the conditioning zone.

For example, the image generation model 510 may perform the denoising without considering condition 530 for diffusion timesteps that are outside of the conditioning zone. During the conditioning zone, the image generation model 510 revisits the current intermediate noise map, denoted as $x_t$, and navigates the sample back by q steps to $x_{t+q}$, followed by resampling (while considering the condition c) back to $x_t$. While this method can introduce additional sampling steps to the generation process, it increases the alignment of the generated synthetic image with the input conditions. In some cases, different conditioning zones (ranges) are set based on different input conditions. This is described in greater detail with reference to FIGS. 10A and 10B.

Figure 6:
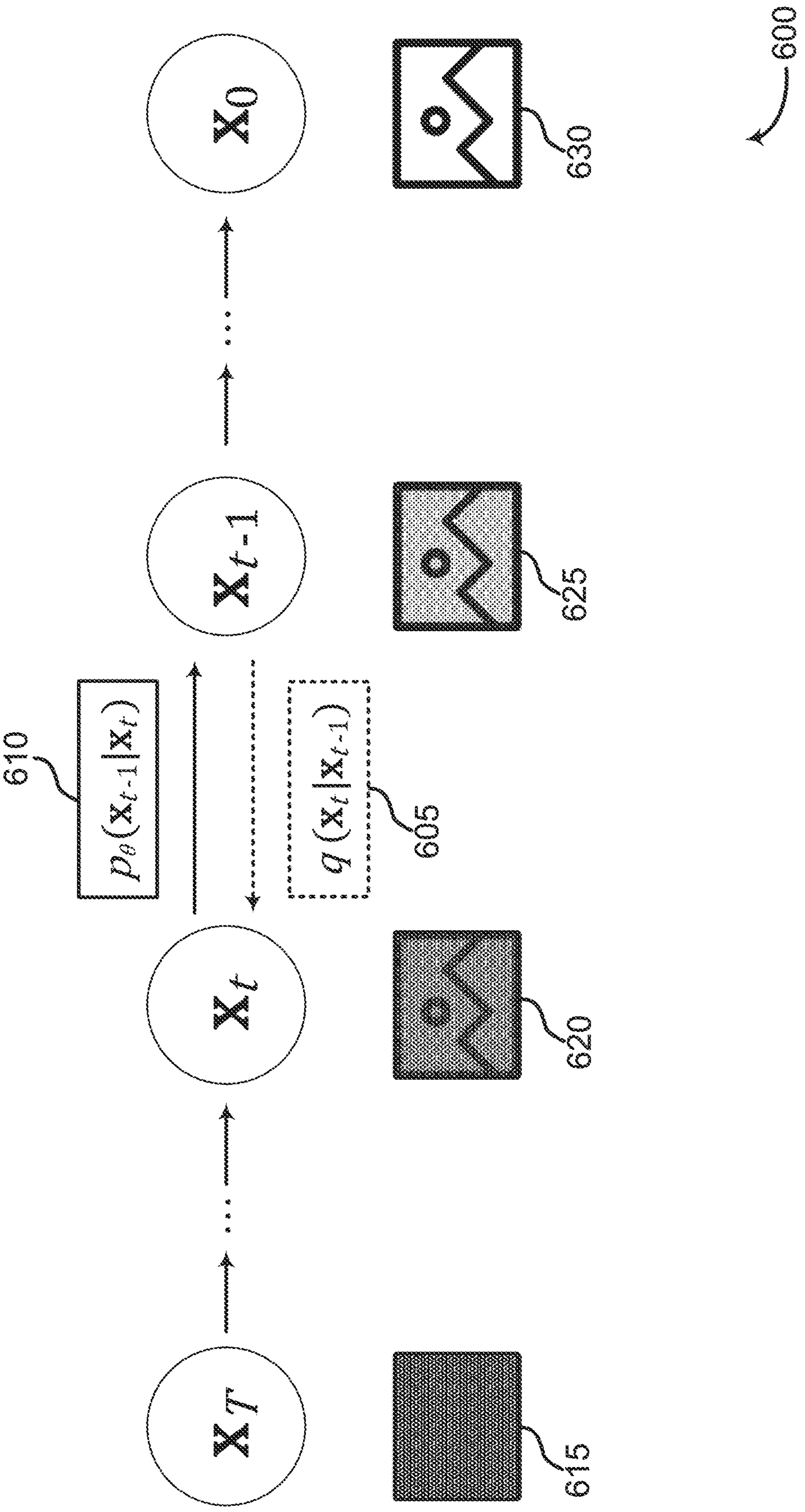
FIG. 6 shows an example of a diffusion process according to aspects of the present disclosure.

FIG. 6 shows a diffusion process 600 according to aspects of the present disclosure. In some examples, diffusion process 600 describes an operation of the image generation model 225 described with reference to FIG. 2, such as the reverse diffusion process 325 of guided diffusion model 300 described with reference to FIG. 3.

As described above with reference to FIG. 3, using a diffusion model can involve both a forward diffusion process 605 for adding noise to an image (or features in a latent space) and a reverse diffusion process 610 for denoising the images (or features) to obtain a denoised image. The forward diffusion process 605 can be represented as $q(x_t|x_{t-1})$, and the reverse diffusion process 610 can be represented as $p(x_{t-1}|x_t)$. In some cases, the forward diffusion process 605 is used during training to generate images with successively greater noise, and a neural network is trained to perform the reverse diffusion process 610 (i.e., to successively remove the noise).

In an example forward process for a latent diffusion model, the model maps an observed variable $x_0$ (either in a pixel space or a latent space) intermediate variables $x_1, \ldots, x_T$ using a Markov chain. The Markov chain gradually adds Gaussian noise to the data to obtain the approximate posterior $q(x_{1:T}|x_0)$ as the latent variables are passed through a neural network such as a U-Net, where $x_1, \ldots, x_7$ have the same dimensionality as $x_0$.

The neural network may be trained to perform the reverse process. During the reverse diffusion process 610, the model begins with noisy data $x_T$, such as a noisy image 615 and denoises the data to obtain the $p(x_{t-1}|x_t)$. At each step t−1, the reverse diffusion process 610 takes $x_t$, such as first intermediate image 620, and t as input. Here, t represents a step in the sequence of transitions associated with different noise levels, The reverse diffusion process 610 outputs $x_{t-1}$, such as second intermediate image 625 iteratively until $x_T$ reverts back to $x_0$, the original image 630. The reverse process can be represented as:

$$p_\theta(x_{t-1}|x_c) := N\left(x_{t-1}; \mu_\theta(x_t, t), \textstyle\sum_\theta(x_t, t)\right) \tag{13}$$

The joint probability of a sequence of samples in the Markov chain can be written as a product of conditionals and the marginal probability:

$$x_T : p_\theta(x_{0:T}) := p(x_T)\prod_{t=1}^{T} p_\theta(x_{t-1}|x_t) \tag{14}$$

where $p(x_T)=N(x_T; 0, I)$ is the pure noise distribution as the reverse process takes the outcome of the forward process, a sample of pure noise, as input and $$\prod_{t=1}^{T} p_\theta(x_{t-1}|x_t)$$

represents a sequence of Gaussian transitions corresponding to a sequence of addition of Gaussian noise to the sample. According to some of the embodiments described herein, the reverse process is based on computing a conditional score function as described with reference to Equations 6-12.

At inference time, observed data $x_0$ in a pixel space can be mapped into a latent space as input and a generated data $\tilde{x}$ is mapped back into the pixel space from the latent space as output. In some examples, $x_0$ represents an original input image with low image quality, latent variables $x_1, \ldots, x_T$ represent noisy images, and $\tilde{x}$ represents the generated image with high image quality.

Figure 7:
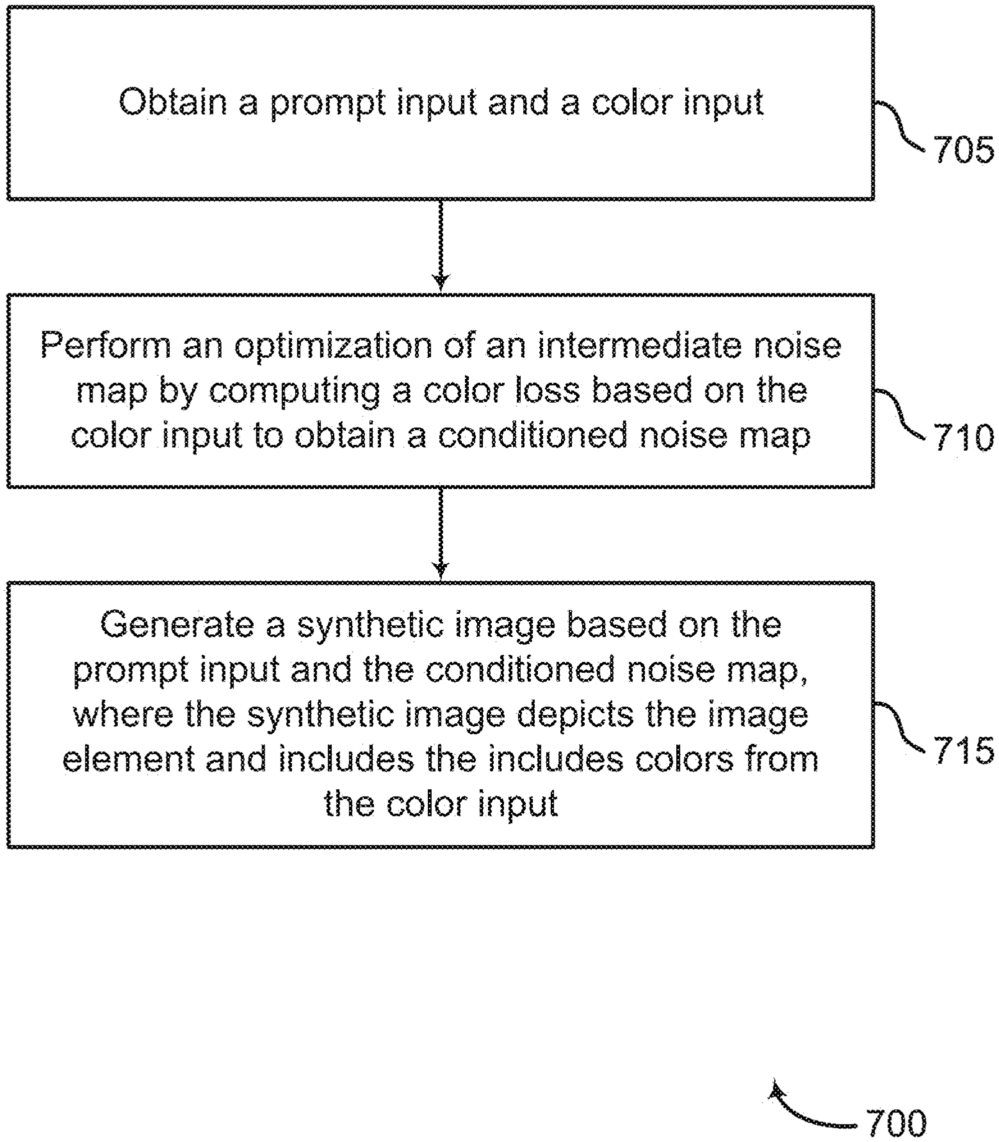
FIG. 7 shows an example of a method for generating a synthetic image based on a color condition according to aspects of the present disclosure.

FIG. 7 shows an example of a method 700 for generating a synthetic image based on a color condition according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 705, the system obtains a prompt input and a color input. In some cases, the operations of this step refer to, or may be performed by, an image processing apparatus as described with reference to FIGS. 1 and 2. For example, the system may receive the prompt input and the color input via a user interface (I/O component) as described with reference to FIG. 2. The prompt input may be, for example, a text input comprising a written description of the content to generate. The color input may be identified by a user by, e.g., a color picker GUI element or by selecting from a set of available color palettes.

At operation 710, the system performs an optimization of an intermediate noise map by computing a color loss based on the color input to obtain a conditioned noise map. In some cases, the operations of this step refer to, or may be performed by, a gradient component as described with reference to FIGS. 2 and 5. The color loss is a measurement of the differences between the intermediate noise map and the color input, as measured in a color space. Additional detail regarding determining these differences is provided with reference to FIG. 5.

At operation 715, the system generates a synthetic image based on the prompt input and the conditioned noise map, where the synthetic image depicts the image element and includes colors from the color input. In some cases, the operations of this step refer to, or may be performed by, an image generation model as described with reference to FIGS. 2 and 5. The image generation model may generate the synthetic image by computing a conditional score function in the manner described with reference to FIG. 5. For example, the conditional score function may be used to compute a denoising vector, which is applied to the conditioned noise map to further denoise it, thereby moving the sample towards the synthetic image. This may be done repeatedly (over multiple diffusion timesteps) to generate the synthetic image.

Figure 8:
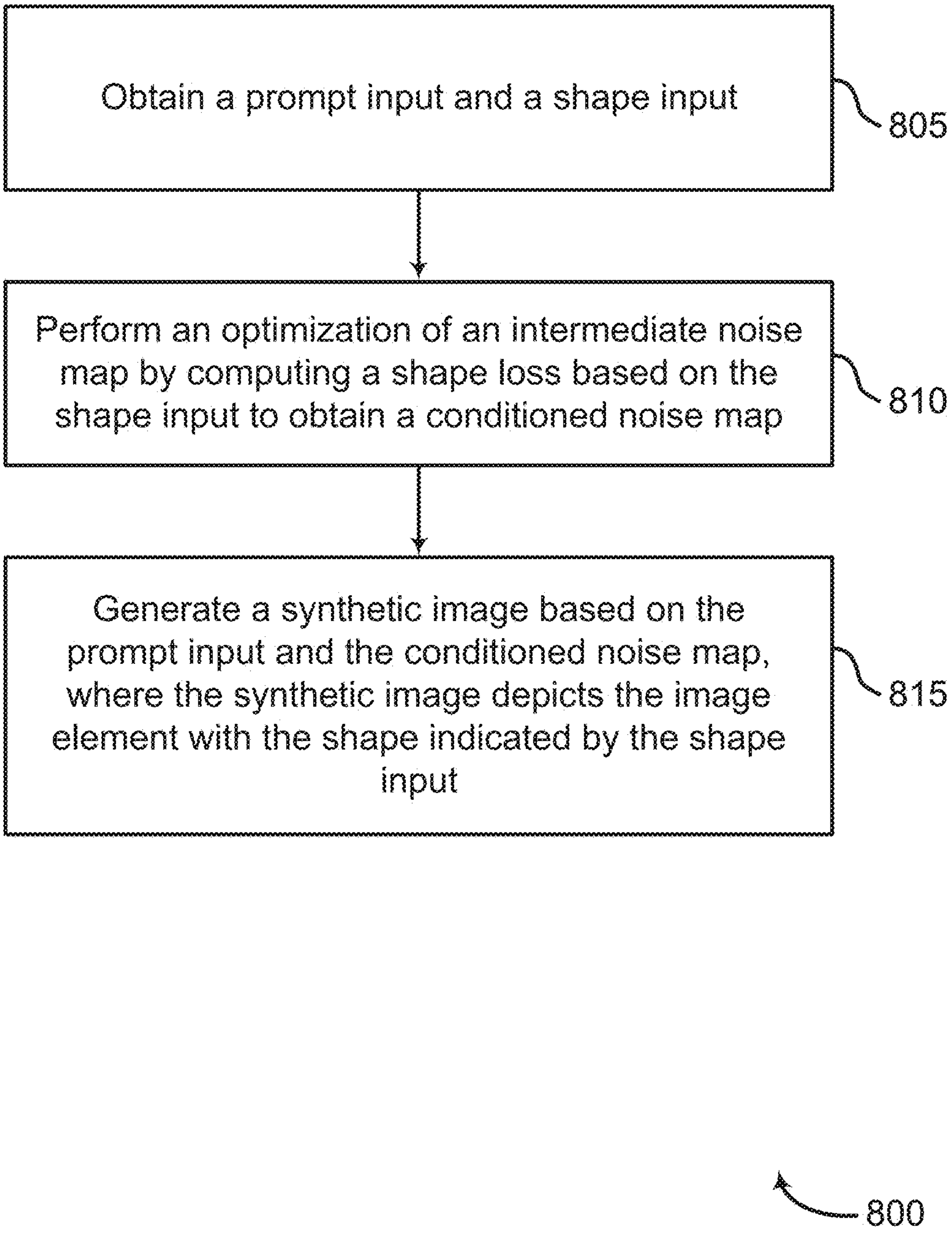
FIG. 8 shows an example of a method for generating a synthetic image based on a shape condition according to aspects of the present disclosure.

FIG. 8 shows an example of a method 800 for generating a synthetic image based on a shape condition according to aspects of the present disclosure. FIG. 8 illustrates a similar process for generating as synthetic image as FIG. 7, except in that the input condition is a shape condition rather than a color condition. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 805, the system obtains a prompt input and a shape input. In some cases, the operations of this step refer to, or may be performed by, an image processing apparatus as described with reference to FIGS. 1 and 2. For example, the system may receive the prompt input and the shape input via a user interface (I/O component) as described with reference to FIG. 2. The prompt input may be, for example, a text input comprising a written description of the content to generate. The shape input may be identified by a user by, e.g., uploading an edge map image, an image (from which the system extracts an edge map image), or by selecting an edge map image or an image.

At operation 810, the system performs an optimization of an intermediate noise map by computing a shape loss based on the shape input to obtain a conditioned noise map. In some cases, the operations of this step refer to, or may be performed by, a gradient component as described with reference to FIGS. 2 and 5. The shape loss is a measurement of the differences between the intermediate noise map and the shape input. Additional detail regarding determining these differences is provided with reference to FIG. 5. For example, the differences may be quantified by performing an IoU operation between an extracted edge map of the intermediate noise map and the shape input.

At operation 815, the system generates a synthetic image based on the prompt input and the conditioned noise map, where the synthetic image depicts the image element with the shape indicated by the shape input. In some cases, the operations of this step refer to, or may be performed by, an image generation model as described with reference to FIGS. 2 and 5. The image generation model may generate the synthetic image by computing a conditional score function in the manner described with reference to FIG. 5. For example, the conditional score function may be used to compute a denoising vector, which is applied to the conditioned noise map to further denoise it, thereby moving the sample towards the synthetic image. This may be done repeatedly (over multiple diffusion timesteps) to generate the synthetic image.

Figure 9:
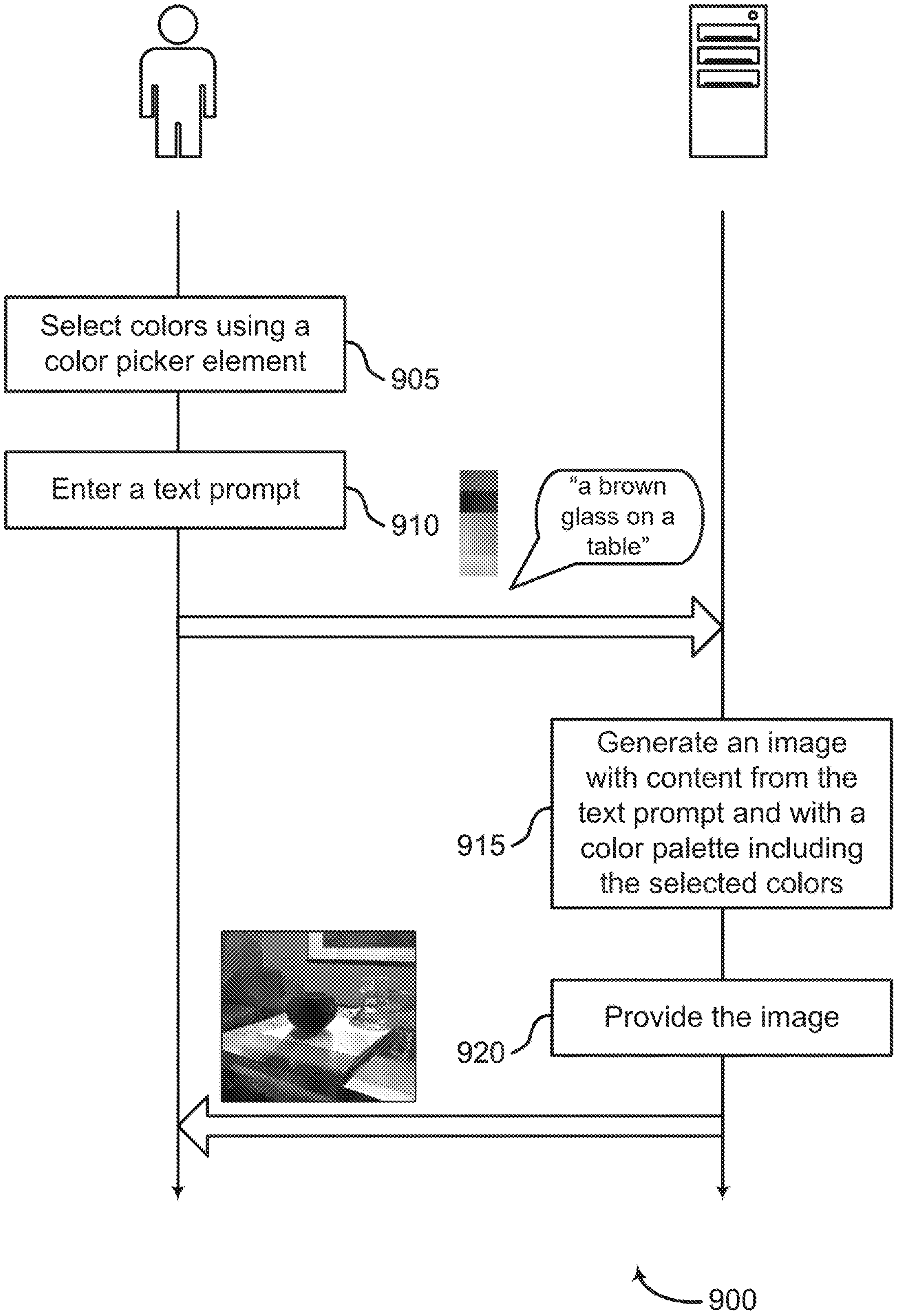
FIG. 9 shows an example of a method for providing a synthetic image with a defined color palette to a user according to aspects of the present disclosure.

FIG. 9 shows an example of a method 900 for providing a synthetic image with a defined color palette to a user according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 905, a user selects colors using a color picker element. A color picker element is a GUI element that includes a display of one or more color spectrums, where the user can select a color by clicking a point on the color spectrum. The color picker element may further include sliders to adjust attributes such as hue, saturation, brightness, and the like. The user may select one color or many colors.

At operation 910, the user enters a text prompt. The text prompt may be, for example, a written description of the content the user wishes to generate. In this example, the user writes "a brown glass on a table." According to some aspects, the word "brown" can be omitted and still result in a similar image, as brown is one of the colors selected by the user.

At operation 915, the system generates an image with content from the text prompt with a color palette including the selected colors. In some cases, the operations of this step refer to, or may be performed by, an image generation model as described with reference to FIGS. 2 and 5. The image generation model may generate the synthetic image by computing a conditional score function in the manner described with reference to FIG. 5. For example, the conditional score function may be used to compute a denoising vector, which is applied to the conditioned noise map to further denoise it, thereby moving the sample towards the synthetic image. This may be done repeatedly (over multiple diffusion timesteps) to generate the synthetic image.

At operation 920, the system provides the image. The system may do so via the user interface. In some cases, the system prompts the user to either approve the image, or to adjust the inputs and regenerate the image.

Figure 10A:
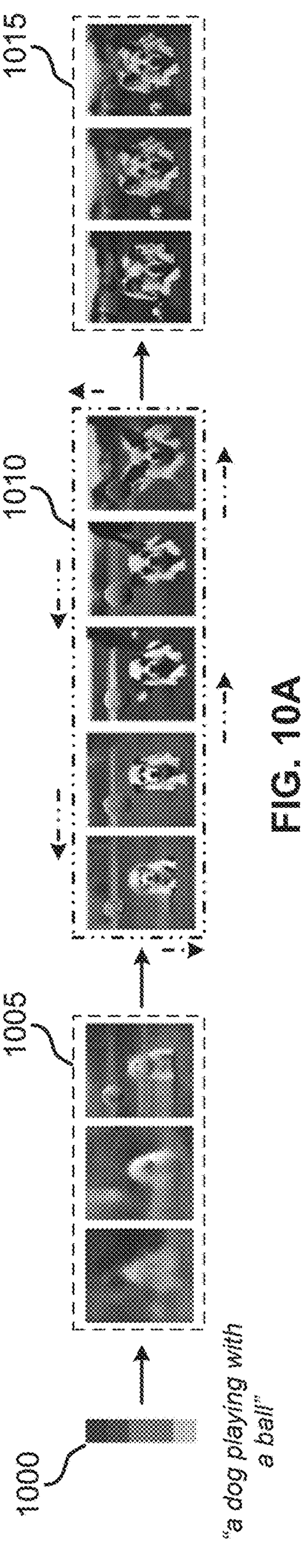
FIGS. 10A and 10B show examples of different sets of diffusion timesteps for conditioning image generation on different types of conditions according to aspects of the present disclosure.
Figure 10B:
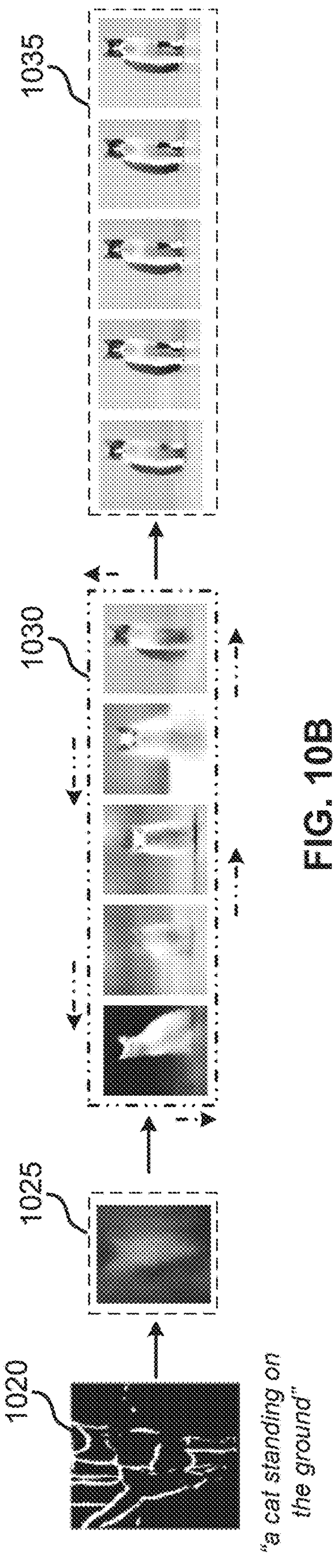

FIGS. 10A and 10B show examples of different sets of diffusion timesteps for conditioning image generation on different types of conditions according to aspects of the present disclosure. The example shown includes color condition 1000, first initial sampling stage 1005, first conditioning zone 1010, first terminal sampling stage 1015, edge map condition 1020, second initial sampling stage 1025, second conditioning zone 1030, and second terminal sampling stage 1035.

Embodiments of the present inventive concepts are configured to identify different conditioning zones, that is, sets of generative diffusion timesteps, according to different input conditions. During the conditioning zone, an image generation model of the present embodiments revisits the current intermediate noise map, denoted as $x_t$, and navigates the sample back by q steps to $x_{t+q}$, followed by resampling (while considering the condition c) back to $x_t$.

In this example, upon receiving color condition 1000, the image processing system selects first initial sampling stage 1005. For example, in a generative diffusion process comprising 100 timesteps (counting down from 100, per convention), the image processing system may select first initial sampling stage 1005 as steps #100-#70. During these steps, the image processing system may perform a denoising process based on only the text prompt, without considering color condition 1000.

The system identifies first conditioning zone 1010 based on the type of conditioning. For example, first conditioning zone 1010 may comprise steps #69-#40. For each step in this set (step 69, then 68, then 67 and so forth), repetition iterations may be performed q times. During this conditioning zone, the image processing system performs a denoising process as described with reference to Equations 6-12, whereby the system denoises in a way that considers color condition 1000.

The first terminal sampling stage 1015 may comprise the remaining diffusion timesteps, e.g. steps #39-0. During this stage, the image processing system may perform a denoising process based on only the text prompt, without considering color condition 1000.

Similarly, the image processing system may identify different initial stages, conditioning zones, and terminal sampling stages based on different types of condition inputs. For example, based on the input edge map condition 1020, the system may identify second initial sampling stage 1025 as steps #100-#95, second conditioning zone 1030 as steps #94-#90, and second terminal sampling stage 1035 as steps #89-#0. According to some aspects, the conditioning operations (including the repetitions) are more effective at transferring the condition at different diffusion timesteps for different types of conditions. For example, structural information from edge maps may be more effectively applied near the beginning of the denoising process (higher numbered diffusion timesteps), and semantic alterations such as color may be more efficiently applied near the middle or the end of the process.

Figure 11:
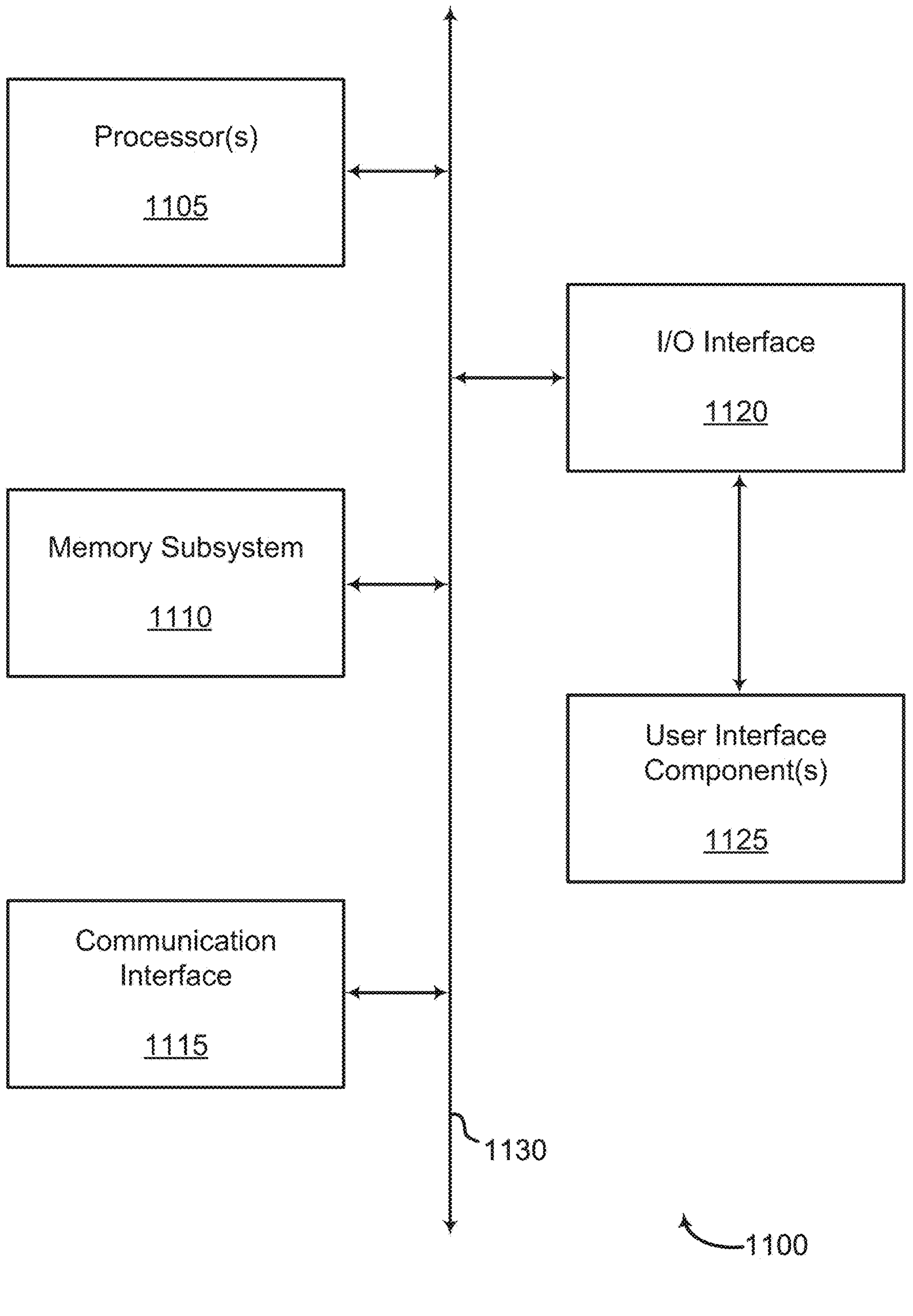
FIG. 11 shows an example of a computing device according to aspects of the present disclosure.

FIG. 11 shows an example of a computing device 1100 according to aspects of the present disclosure. The example shown includes computing device 1100, processor(s), memory subsystem 1110, communication interface 1115, I/O interface 1120, user interface component(s), and channel 1130.

In some embodiments, computing device 1100 is an example of, or includes aspects of, image processing apparatus 100 of FIG. 1. In some embodiments, computing device 1100 includes one or more processors 1105 are configured to execute instructions stored in memory subsystem 1110 to obtain a prompt input and a color input, wherein the prompt input describes an image element and the color input indicates a color palette; perform an optimization of an intermediate noise map by computing a color loss based on the color input to obtain a conditioned noise map; and generate, using an image generation model, a synthetic image based on the prompt input and the conditioned noise map, wherein the synthetic image depicts the image element and includes colors from the color palette.

According to some aspects, computing device 1100 includes one or more processors 1105. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing.

According to some aspects, memory subsystem 1110 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. The memory may store various parameters of machine learning models used in the components described with reference to FIG. 2. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 1115 operates at a boundary between communicating entities (such as computing device 1100, one or more user devices, a cloud, and one or more databases) and channel 1130 and can record and process communications. In some cases, communication interface 1115 is provided to enable a processing system coupled to a transceiver (e.g., a transmitter and/or a receiver). In some examples, the transceiver is configured to transmit (or send) and receive signals for a communications device via an antenna.

According to some aspects, I/O interface 1120 is controlled by an I/O controller to manage input and output signals for computing device 1100. In some cases, I/O interface 1120 manages peripherals not integrated into computing device 1100. In some cases, I/O interface 1120 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1120 or via hardware components controlled by the I/O controller.

According to some aspects, user interface component(s) 1125 enable a user to interact with computing device 1100. In some cases, user interface component(s) 1125 include an audio device, such as an external speaker system, an external display device such as a display screen, an input device (e.g., a remote-control device interfaced with a user interface directly or through the I/O controller), or a combination thereof. In some cases, user interface component(s) 1125 include a GUI, such as the one described with reference to FIG. 2.

Accordingly, the present disclosure includes the following aspects.

A method for image generation is described. One or more aspects of the method include obtaining a prompt input and a color input, wherein the prompt input describes an image element and the color input indicates a color palette; performing an optimization of an intermediate noise map by computing a color loss based on the color input to obtain a conditioned noise map; and generating, using an image generation model, a synthetic image based on the prompt input and the conditioned noise map, wherein the synthetic image depicts the image element and includes colors from the color palette.

Some examples of the method, apparatus, non-transitory computer readable medium, and system further include encoding the intermediate noise map to obtain a color embedding. Some examples further include encoding the color input to obtain a condition embedding. Some examples further include computing a distance between the color embedding and the condition embedding, wherein the color loss is based on the distance.

Some examples of the method, apparatus, non-transitory computer readable medium, and system further include generating a color palette matrix based on the color input. Some examples further include computing a pairwise distance for each of a plurality of pixels based on the intermediate noise map and the color palette matrix, wherein the color loss is computed based on the pairwise distance.

Some examples of the method, apparatus, non-transitory computer readable medium, and system further include performing a softmax transformation on the pairwise distance for each of the plurality of pixels, wherein the color loss is based on the softmax transformation.

Some examples of the method, apparatus, non-transitory computer readable medium, and system further include determining a predicted color distribution based on the intermediate noise map and a target color distribution based on the color input, wherein the color loss is based on the predicted color distribution and the target color distribution.

In some aspects, the color loss is based on an energy conditioning function.

Some examples of the method, apparatus, non-transitory computer readable medium, and system further include identifying a current timestep. Some examples further include executing one or more layers of the image generation model for a plurality of repetitions at the current timestep.

Some examples of the method, apparatus, non-transitory computer readable medium, and system further include identifying a preliminary timestep prior to the current timestep, wherein the one or more layers of the image generation model are executed for the plurality of repetitions between the preliminary timestep and the current timestep.

Some examples of the method, apparatus, non-transitory computer readable medium, and system further include identifying a conditioning zone comprising a plurality of timesteps based on the color input, wherein the wherein the one or more layers of the image generation model are executed based on the current timestep being within the conditioning zone.

A method for image generation is described. One or more aspects of the method include obtaining a prompt input and a shape input, wherein the prompt input describes an image element and the shape input indicates a shape for the image element; performing an optimization of an intermediate noise map by computing a shape loss based on the shape input to obtain a conditioned noise map; and generating, using an image generation model, a synthetic image based on the prompt input and the conditioned noise map, wherein the synthetic image depicts the image element with the shape indicated by the shape input.

Some examples of the method, apparatus, non-transitory computer readable medium, and system further include identifying a target set of edge pixels based on the shape input. Some examples further include identifying a predicted set of edge pixels based on the intermediate noise map, wherein the shape loss is based on the target set of edge pixels and the predicted set of edge pixels.

Some examples of the method, apparatus, non-transitory computer readable medium, and system further include computing an intersection over union (IoU) ratio based on the target set of edge pixels and the predicted set of edge pixels, wherein the shape loss is based on the IoU ratio.

Some examples of the method, apparatus, non-transitory computer readable medium, and system further include identifying a conditioning zone comprising a plurality of timesteps based on the shape input, wherein the wherein the one or more layers of the image generation model are executed based on the current timestep being within the conditioning zone.

Some examples of the method, apparatus, non-transitory computer readable medium, and system further include identifying a current timestep. Some examples further include executing one or more layers of the image generation model for a plurality of repetitions at the current timestep.

An apparatus for image generation is described. One or more aspects of the apparatus include at least one processor; at least one memory storing instructions executable by the at least one processor; a condition encoder comprising parameters stored in the memory component and configured to encode a condition input including a color palette to obtain a condition embedding; and an image generation model configured to generate a conditioned noise map by performing a noise map optimization using the condition embedding, and further configured to generate a synthetic image based on a prompt input and the conditioned noise map.

In some aspects, the condition encoder comprises a color encoder. Additionally or alternatively, the condition encoder may include an edge map generator. Some examples further include a text encoder configured to encode the prompt input to obtain a prompt embedding. In some aspects, the image generation model comprises a diffusion U-Net.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:

obtaining a prompt input and a color input, wherein the prompt input describes an image element and the color input indicates a color palette;

generating a conditioned noise map by performing a noise map optimization using a color loss based on the color input, wherein the noise map optimization computes a conditional score function comprising an unconditional score term and a correction term; and generating, using an image generation model, a synthetic image by denoising the conditioned noise map based on the prompt input, wherein the synthetic image depicts the image element and includes colors from the color palette.

2. The method of claim 1, wherein performing the noise map optimization comprises:

encoding an intermediate noise map to obtain a color embedding;

encoding the color input to obtain a condition embedding; and computing a distance between the color embedding and the condition embedding, wherein the color loss is based on the distance.

3. The method of claim 1, wherein performing the noise map optimization comprises:

generating a color palette matrix based on the color input; and computing a pairwise distance for each of a plurality of pixels based on an intermediate noise map and the color palette matrix, wherein the color loss is computed based on the pairwise distance.

4. The method of claim 3, further comprising:

performing a softmax transformation on the pairwise distance for each of the plurality of pixels, wherein the color loss is based on the softmax transformation.

5. The method of claim 1, further comprising:

determining a predicted color distribution based on an intermediate noise map and a target color distribution based on the color input, wherein the color loss is based on the predicted color distribution and the target color distribution.

6. The method of claim 1, wherein:

the color loss is based on an energy conditioning function.

7. The method of claim 1, wherein performing the noise map optimization comprises:

identifying a current timestep; and executing one or more layers of the image generation model for a plurality of repetitions at the current timestep.

8. The method of claim 7, further comprising:

identifying a preliminary timestep prior to the current timestep, wherein the one or more layers of the image generation model are executed for the plurality of repetitions between the preliminary timestep and the current timestep.

9. The method of claim 7, wherein performing the noise map optimization comprises:

identifying a conditioning zone comprising a plurality of timesteps based on the color input, wherein the wherein the one or more layers of the image generation model are executed based on the current timestep being within the conditioning zone.

10. A non-transitory computer readable medium storing code for image processing, the code comprising instructions that, when executed by at least one processor, cause the at least one processor to perform operations comprising:

obtaining a prompt input and a shape input, wherein the prompt input describes an image element and the shape input indicates a shape for the image element;

generating a conditioned noise map performing a noise map optimization using a shape loss based on the shape input, wherein the noise map optimization computes a conditional score function comprising an unconditional score term and a correction term; and generating, using an image generation model, a synthetic image based on the prompt input and the conditioned noise map, wherein the synthetic image depicts the image element with the shape indicated by the shape input.

11. The non-transitory computer readable medium of claim 10, wherein performing the optimization comprises:

identifying a target set of edge pixels based on the shape input; and identifying a predicted set of edge pixels based on an intermediate noise map, wherein the shape loss is based on the target set of edge pixels and the predicted set of edge pixels.

12. The non-transitory computer readable medium of claim 11, the code further comprising instructions that, when executed by the at least one processor, cause the at least one processor to perform operations comprising:

computing an intersection over union (IoU) ratio based on the target set of edge pixels and the predicted set of edge pixels, wherein the shape loss is based on the IoU ratio.

13. The non-transitory computer readable medium of claim 10, wherein performing the optimization comprises:

identifying a conditioning zone comprising a plurality of timesteps based on the shape input, wherein the wherein the one or more layers of the image generation model are executed based on the current timestep being within the conditioning zone.

14. The non-transitory computer readable medium of claim 10, wherein performing the optimization comprises:

identifying a current timestep; and executing one or more layers of the image generation model for a plurality of repetitions at the current timestep.

15. A system comprising:

a memory component; and a processing device coupled to the memory component;

a condition encoder comprising parameters stored in the memory component and configured to encode a condition input representing a color palette to obtain a condition embedding; and an image generation model configured to generate a conditioned noise map by performing a noise map optimization using the condition embedding and to generate a synthetic image based on a prompt input and the conditioned noise map, wherein the noise map optimization computes a conditional score function comprising an unconditional score term and a correction term.

16. The system of claim 15, wherein:

the synthetic image depicts the image element and includes colors from the color palette.

17. The system of claim 15, wherein:

the condition encoder comprises a color encoder.

18. The system of claim 15, wherein:

the condition encoder comprises an edge map generator.

19. The system of claim 15, further comprising:

a text encoder configured to encode the prompt input to obtain a prompt embedding.

20. The system of claim 15, wherein:

the image generation model comprises a diffusion U-Net.

* * * * *